US012531387B2

(12) United States Patent
Tamaru et al.

(10) Patent No.: US 12,531,387 B2
(45) Date of Patent: Jan. 20, 2026

(54) ULTRAVIOLET LASER APPARATUS AND ELECTRONIC DEVICE MANUFACTURING METHOD

(71) Applicants: Gigaphoton Inc., Tochigi (JP); Inter-University Research Institute Corporation, National Institutes of Natural Sciences, Tokyo (JP)

(72) Inventors: Yuki Tamaru, Oyama (JP); Taisuke Miura, Oyama (JP); Ryo Yasuhara, Toki (JP)

(73) Assignees: Gigaphoton Inc., Tochigi (JP); Inter-University Research Institute Corporation, National Institutes of Natural Sciences, Tokyo (JP)

( * ) Notice: Subject to any disclaimer, the term of this patent is extended or adjusted under 35 U.S.C. 154(b) by 110 days.

(21) Appl. No.: 18/363,602

(22) Filed: Aug. 1, 2023

(65) Prior Publication Data

US 2023/0378713 A1   Nov. 23, 2023

Related U.S. Application Data

(63) Continuation of application No. PCT/JP2021/011548, filed on Mar. 19, 2021.

(51) Int. Cl.
*H01S 3/10* (2006.01)
*G03F 7/00* (2006.01)
(Continued)

(52) U.S. Cl.
CPC ...... *H01S 3/10061* (2013.01); *G03F 7/70025* (2013.01); *G03F 7/70191* (2013.01);
(Continued)

(58) Field of Classification Search
CPC ..... G02F 1/093; G02B 27/28; G03F 7/70025; G03F 7/70191; H01S 3/0014;
(Continued)

(56) References Cited

U.S. PATENT DOCUMENTS

2003/0030905 A1\* 2/2003 Abe .................. G02B 27/28
359/489.05
2003/0156605 A1\* 8/2003 Richardson ......... H01S 3/06791
372/25

(Continued)

FOREIGN PATENT DOCUMENTS

CN      108183388 A    6/2018
JP      S61-141189 A   6/1986
(Continued)

OTHER PUBLICATIONS

An Office Action issued by the Japanese Patent Office on Jul. 12, 2024, which corresponds to Japanese Patent Application No. 2023-506705 and is related to U.S. Appl. No. 18/363,602.
(Continued)

*Primary Examiner* — Deoram Persaud
(74) *Attorney, Agent, or Firm* — Studebaker Brackett PLLC

(57) ABSTRACT

An ultraviolet laser apparatus includes an oscillation-stage laser, an amplifier that amplifies the pulse laser light, and an optical isolator. The optical isolator includes a first Faraday rotator that rotates the polarization direction of the pulse laser light output from the oscillation-stage laser by a first angle in a first rotation direction, a first polarizer so disposed to transmit the pulse laser light that exits out of the first Faraday rotator at normalized transmittance greater than or equal to 0.9, a second Faraday rotator that rotates the polarization direction of the pulse laser light passing through the first polarizer by a second angle in the opposite direction to the first rotation direction, and a second polarizer so
(Continued)

disposed to transmit the pulse laser light that exits out of the second Faraday rotator at the normalized transmittance greater than or equal to 0.9.

20 Claims, 10 Drawing Sheets

(51) Int. Cl.
　　　*H01S 3/00*　　　(2006.01)
　　　*H01S 3/225*　　(2006.01)
　　　*H01S 3/23*　　　(2006.01)
(52) U.S. Cl.
　　　CPC .......... *H01S 3/0014* (2013.01); *H01S 3/0064* (2013.01); *H01S 3/0071* (2013.01); *H01S 3/2251* (2013.01); *H01S 3/2256* (2013.01); *H01S 3/2325* (2013.01)
(58) Field of Classification Search
　　　CPC .. H01S 3/0064; H01S 3/0071; H01S 3/08009; H01S 3/10061; H01S 3/10092; H01S 3/2251; H01S 3/2256; H01S 3/2325; H01S 3/2366
　　　See application file for complete search history.

(56) References Cited

U.S. PATENT DOCUMENTS

| | | | |
|---|---|---|---|
| 2004/0264829 A1* | 12/2004 | Shou | G02F 1/093 385/11 |
| 2007/0121686 A1* | 5/2007 | Vaissie | H01S 3/0064 372/27 |
| 2009/0245304 A1 | 10/2009 | Peng et al. | |
| 2012/0243565 A1 | 9/2012 | Onose et al. | |
| 2014/0160565 A1* | 6/2014 | Rogers | G02B 6/4208 359/484.03 |
| 2014/0346374 A1* | 11/2014 | Yanagida | G02F 1/093 359/333 |
| 2015/0351208 A1* | 12/2015 | Suganuma | H01S 3/0078 359/337.2 |
| 2016/0274305 A1 | 9/2016 | Ye et al. | |
| 2017/0317464 A1 | 11/2017 | Kurosawa et al. | |
| 2018/0156976 A1* | 6/2018 | Watanabe | G02B 6/2746 |
| 2018/0356656 A1* | 12/2018 | Watanabe | G02F 1/0036 |
| 2019/0004343 A1* | 1/2019 | Watanabe | G02F 1/093 |
| 2020/0403372 A1 | 12/2020 | Baker | H01S 3/1608 |
| 2024/0103305 A1* | 3/2024 | Fuchimukai | G02B 27/28 |
| 2024/0128701 A1* | 4/2024 | Fuchimukai | H01S 3/2308 |
| 2024/0264475 A1* | 8/2024 | Cruz | G02F 1/092 |
| 2025/0076692 A1* | 3/2025 | Chen | G02B 5/3083 |

FOREIGN PATENT DOCUMENTS

| | | |
|---|---|---|
| JP | H02-108017 A | 4/1990 |
| JP | H05-259560 A | 10/1993 |
| JP | H08-005960 A | 1/1996 |
| JP | 2003-241141 A | 8/2003 |
| JP | 2004-062006 A | 2/2004 |
| JP | 2004-214323 A | 7/2004 |
| JP | 2006-119661 A | 5/2006 |
| JP | 2010-514214 A | 4/2010 |
| JP | 2011-517066 A | 5/2011 |
| JP | 2012-151419 A | 8/2012 |
| JP | 2012-199425 A | 10/2012 |
| JP | 2018-205586 A | 12/2018 |
| WO | 2008/088488 A1 | 7/2008 |
| WO | 2016/142995 A1 | 9/2016 |

OTHER PUBLICATIONS

International Search Report issued in PCT/JP2021/011548; mailed Jun. 1, 2021.
International Preliminary Report On Patentability and Written Opinion issued in PCT/JP2021/011548; issued Sep. 12, 2023.
An Office Action, "Notice of Reasons for Refusal," mailed by the Japanese Patent Office on Oct. 30, 2025, which corresponds to Japanese Patent Application No. 2024-230077 and is related to U.S. Appl. No. 18/363,602; with English language translation.
Bigio, I. et al., "Injection-Locking Unstable Resonator Excimer Lasers", IEEE Journal of Quantum Electronics, Sep. 1983, vol. 19, No. 9, pp. 1426-1436, DOI: 10.1109/JQE.1983.1072045.

* cited by examiner

| MATERIAL | CaF2 | | SiO2 | |
|---|---|---|---|---|
| VERDET CONSTANT | 40.1 rad/Tm | | 70.1 rad/Tm | |
| ITEM | MAGNETIC FIELD (T) | THICKNESS (mm) | MAGNETIC FIELD (T) | THICKNESS (mm) |
| SELECTABLE RANGE | 0.5 – 3.0 | 6 – 40 | 0.5 – 3.0 | 3 – 25 |
| PREFERABLE RANGE | 0.75 – 2.9 | 10 – 30 | 0.75 – 2.9 | 6 – 20 |
| MOST PREFERABLE RANGE | 0.8 – 1.5 | 15 – 25 | 0.8 – 1.5 | 8 – 15 |

| MATERIAL | CaF2 | | SiO2 | |
|---|---|---|---|---|
| VERDET CONSTANT | 19.0 rad/Tm | | 30.4 rad/Tm | |
| ITEM | MAGNETIC FIELD (T) | THICKNESS (mm) | MAGNETIC FIELD (T) | THICKNESS (mm) |
| SELECTABLE RANGE | 0.5 – 3.0 | 13 – 83 | 0.5 – 3.0 | 8 – 53 |
| PREFERABLE RANGE | 0.75 – 2.9 | 20 – 55 | 0.75 – 2.9 | 10 – 40 |
| MOST PREFERABLE RANGE | 0.8 – 1.5 | 30 – 50 | 0.8 – 1.5 | 15 – 30 |

ULTRAVIOLET LASER APPARATUS AND ELECTRONIC DEVICE MANUFACTURING METHOD

CROSS-REFERENCE TO RELATED APPLICATIONS

The present application is a continuation application of International Application No. PCT/JP2021/011548, filed on Mar. 19, 2021, the entire contents of which are hereby incorporated by reference.

BACKGROUND

1. Technical Field

The present disclosure relates to an ultraviolet laser apparatus and an electronic device manufacturing method.

2. Related Art

In recent years, a semiconductor exposure apparatus is required to improve the resolution thereof as semiconductor integrated circuits are increasingly miniaturized and highly integrated. To this end, reduction in the wavelength of light output from a light source for exposure is underway. For example, a KrF excimer laser apparatus, which outputs laser light having a wavelength of about 248 nm, and an ArF excimer laser apparatus, which outputs laser light having a wavelength of about 193 nm, are used as a gas laser apparatus for exposure.

Light from spontaneously oscillating KrF and ArF excimer laser apparatuses has a wide spectral linewidth ranging from 350 to 400 pm. A projection lens made of a material that transmits ultraviolet light, such as KrF and ArF laser light, therefore produces chromatic aberrations in some cases. As a result, the resolution of the projection lens may decrease. To avoid the decrease in the resolution, the spectral linewidth of the laser light output from the gas laser apparatus needs to be narrow enough to make the chromatic aberrations negligible. To this end, a line narrowing module (LNM) including a line narrowing element (such as etalon and grating) is provided in some cases in a laser resonator of the gas laser apparatus to narrow the spectral linewidth. A gas laser apparatus providing a narrowed spectral linewidth is hereinafter referred to as a narrowed-line gas laser apparatus.

CITATION LIST

Patent Literature

[PTL 1] JP2004-62006A
[PTL 2] JP61-141189A
[PTL 3] JP2011-517066T

SUMMARY

An ultraviolet laser apparatus according to an aspect of the present disclosure includes an oscillation-stage laser configured to output linearly polarized pulse laser light having ultraviolet wavelengths, an amplifier configured to amplify the pulse laser light and output the amplified pulse laser light, and an optical isolator disposed on an optical path between the oscillation-stage laser and the amplifier, the optical isolator including a first Faraday rotator configured to rotate a polarization direction of the pulse laser light output from the oscillation-stage laser by a first angle in a first rotation direction with aid of a magnetic field in a first direction, a first polarizer so disposed that normalized transmittance for the pulse laser light that exits out of the first Faraday rotator is greater than or equal to 0.9, a second Faraday rotator configured to rotate the polarization direction of the pulse laser light passing through the first polarizer by a second angle in a second rotation direction that is an opposite direction to the first rotation direction with aid of a magnetic field in a second direction that is an opposite direction to the first direction, and a second polarizer so disposed that the normalized transmittance for the pulse laser light that exits out of the second Faraday rotator is greater than or equal to 0.9.

An electronic device manufacturing method according to an aspect of the present disclosure includes: generating laser light amplified by an amplifier using an ultraviolet laser apparatus including an oscillation-stage laser configured to output linearly polarized pulse laser light having ultraviolet wavelengths, the amplifier configured to amplify the pulse laser light and output the amplified pulse laser light, and an optical isolator disposed on an optical path between the oscillation-stage laser and the amplifier, the optical isolator including a first Faraday rotator configured to rotate a polarization direction of the pulse laser light output from the oscillation-stage laser by a first angle in a first rotation direction with aid of a magnetic field in a first direction, a first polarizer so disposed that normalized transmittance for the pulse laser light that exits out of the first Faraday rotator is greater than or equal to 0.9, a second Faraday rotator configured to rotate the polarization direction of the pulse laser light passing through the first polarizer by a second angle in a second rotation direction that is an opposite direction to the first rotation direction with aid of a magnetic field in a second direction that is an opposite direction to the first direction, and a second polarizer so disposed that the normalized transmittance for the pulse laser light that exits out of the second Faraday rotator is greater than or equal to 0.9; outputting the amplified laser light to an exposure apparatus; and exposing a photosensitive substrate to the laser light in the exposure apparatus to manufacture electronic devices.

BRIEF DESCRIPTION OF THE DRAWINGS

Embodiments of the present disclosure will be described below only by way of example with reference to the accompanying drawings.

DETAILED DESCRIPTION

Contents

Figure 1:
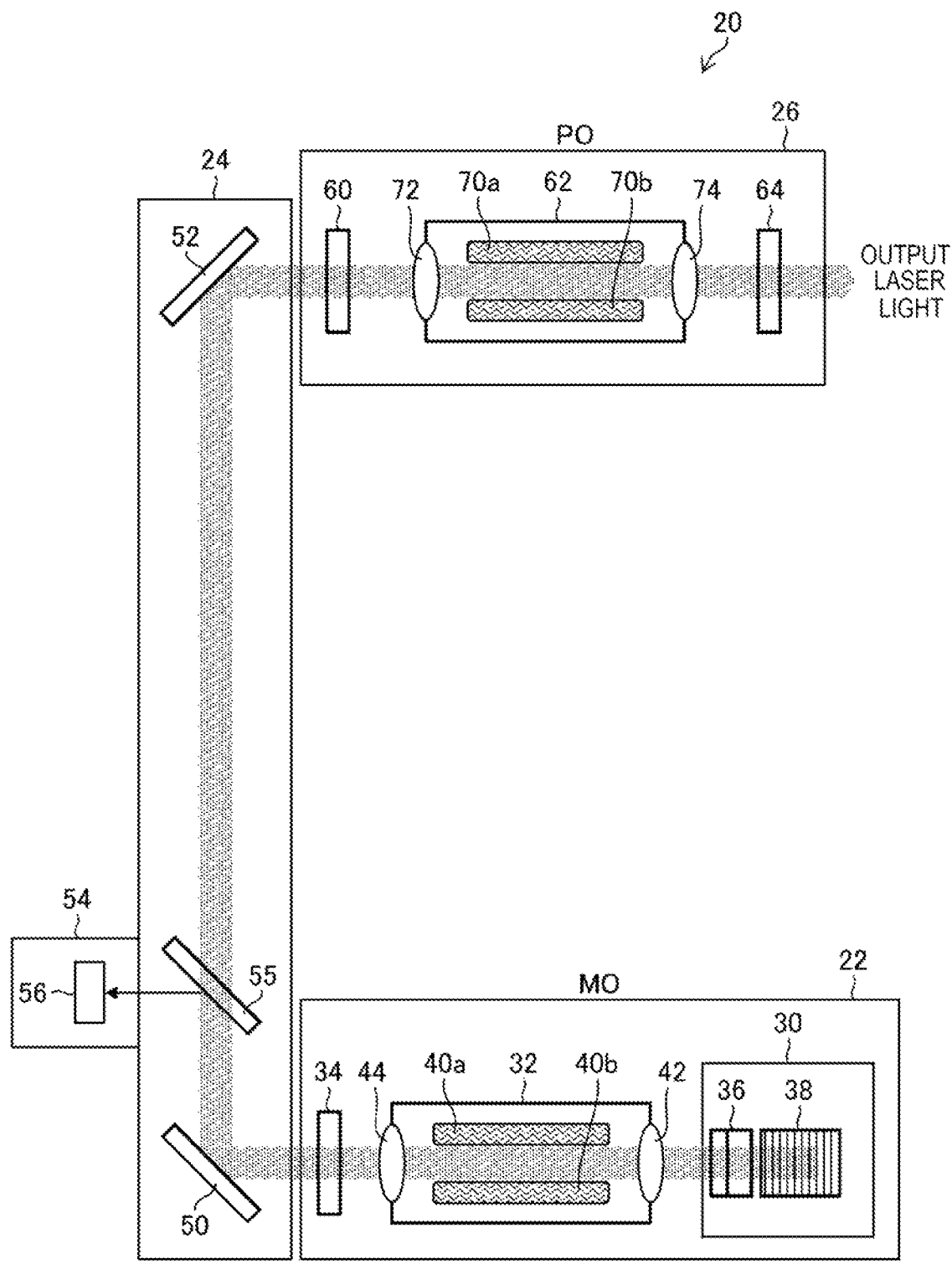
FIG. 1 is a side view schematically showing the configuration of an ultraviolet laser apparatus according to Comparative Example.

1. Description of terms
2. Overview of ultraviolet laser apparatus according to Comparative Example
  2.1 Configuration
  2.2 Operation
3. Problems
4. First embodiment
  4.1 Configuration
  4.2 Operation
  4.3 Specific example of Faraday rotators
  4.4 Allowable angular difference between transmission axis of polarizer and polarization direction of laser light
  4.5 Effects and advantages
  4.6 Variations
5. Second embodiment
  5.1 Configuration
  5.2 Operation
  5.3 Effects and advantages
6. Third embodiment
  6.1 Configuration
  6.2 Operation
  6.3 Effects and advantages
7. Fourth embodiment
  7.1 Configuration
  7.2 Operation
  7.3 Effects and advantages
8. Electronic device manufacturing method
9. Others Embodiments of the present disclosure will be described below in detail with reference to the drawings. The embodiments described below show some examples of the present disclosure and are not intended to limit the contents of the present disclosure. Further, all configurations and operations described in the embodiments are not necessarily essential as configurations and operations in the present disclosure. The same component has the same reference character, and no redundant description of the same component will be made.

1. Description of Terms

The term "polarizer" is an optical element that separates light polarized in a specific polarization direction (direction of transmission axis) from light polarized in a direction perpendicular to the specific polarization direction.

The term "parallel" in the present specification is not limited to exactly parallel unless otherwise clearly stated except for a case where it is obvious from the context and includes the concept of approximately parallel including an angular difference range that falls within the technical sense but is practically accepted. The term "vertical" or "perpendicular" in the present specification is also not limited to exactly vertical or perpendicular unless otherwise clearly stated except for a case where it is obvious from the context and includes the concept of approximately vertical or perpendicular including an angular difference range that falls within the technical sense but is practically accepted.

2. Overview of ultraviolet laser apparatus according to Comparative Example 2.1 Configuration FIG. 1 is a side view schematically showing the configuration of an ultraviolet laser apparatus 20 according to Comparative Example. Comparative Example in the present disclosure is an aspect that the applicant is aware of as known only by the applicant, and is not a publicly known example that the applicant is self-aware of.

The ultraviolet laser apparatus 20 is an excimer laser apparatus including a master oscillator (MO) 22, an MO beam steering unit 24, and a power oscillator (PO) 26. The MO 22 includes a line narrowing module (LNM) 30, a chamber 32, and an output coupling mirror 34.

The LNM 30 includes a prism expander 36 and a grating 38, which narrow the spectral width. The prism expander 36 and the grating 38 are disposed in the Littrow arrangement, which causes the angle of incidence of the light incident on the grating 38 to be equal to the angle of diffraction of the light diffracted by the grating 38. The output coupling mirror 34 is a partially reflective mirror having a reflectance ranging from 40% to 60%. The output coupling mirror 34 and the LNM 30 are arranged to constitute an optical resonator.

The chamber 32 is disposed on the optical path of the optical resonator. The chamber 32 includes a pair of discharge electrodes 40a and 40b, and two windows 42 and 44, which transmit the laser light. The chamber 32 is filled with a laser gas. The laser gas contains a rare gas, a halogen gas, and a buffer gas. The rare gas may, for example, be an argon (Ar) or a krypton (Kr) gas. The halogen gas may, for example, be a fluorine ($F_2$) gas. The buffer gas may, for example, be a neon (Ne) gas. A voltage is applied by a power supply that is not shown to the space between the discharge electrodes 40a and 40b. The power supply may be a pulse power module (PPM) including a switch and a charging capacitor.

The MO beam steering unit 24 includes highly reflective mirrors 50 and 52 and is so disposed that the laser light output from the MO 22 enters the PO 26.

An MO pulse energy monitor 54 is disposed between the highly reflective mirror 50 and the highly reflective mirror 52. The MO pulse energy monitor 54 includes a beam splitter (BS) 55 and a photosensor 56. The BS 55 is so disposed on the optical path of the pulse laser light output from the MO 22 that the light reflected off the BS 55 is incident on the photosensor 56.

The PO 26 is an amplification-stage laser including a rear mirror 60, a chamber 62, and an output coupling mirror 64. The rear mirror 60 and the output coupling mirror 64 constitute an optical resonator, and the chamber 62 is disposed on the optical path of the optical resonator.

The configuration of the chamber 62 may be the same as that of the chamber 32. The chamber 62 includes a pair of discharge electrodes 70a and 70b, and two windows 72 and 74. The chamber 62 is filled with a laser gas. The rear mirror 60 may, for example, be a partially reflective mirror having a reflectance ranging from 50% to 90%. The output coupling mirror 64 may be a partially reflective mirror having a reflectance ranging from 10% to 30%.

2.2 Operation

The power supply that is not shown applies high voltage pulses to the space between the discharge electrodes 40a and 40b in the chamber 32. When discharge occurs between the discharge electrodes 40a and 40b in the chamber 32, the laser gas is excited, and pulse laser light having ultraviolet wavelengths ranging from 150 nm to 380 nm, which form a narrowed bandwidth achieved by the optical resonator having the output coupling mirror 34 and the LNM 30, exits via the output coupling mirror 34.

The energy of the pulse laser light having exited via the output coupling mirror 34 is measured by the MO pulse energy monitor 54. The MO beam steering unit 24 causes the pulse laser light to be incident as seed light on the rear mirror 60 of the PO 26.

At the timing when the seed light having passed through the rear mirror 60 enters the chamber 62, a power supply that is not shown applies high-voltage pulses to the space between the discharge electrodes 70a and 70b in the chamber 62. When discharge occurs between the discharge electrodes 70a and 70b in the chamber 62, the laser gas is excited, and the seed light is amplified by the Fabry-Perot-type optical resonator having the output coupling mirror 64 and the rear mirror 60 so that the amplified pulse laser light exits as output laser light via the output coupling mirror 64.

3. Problems

Figure 2:
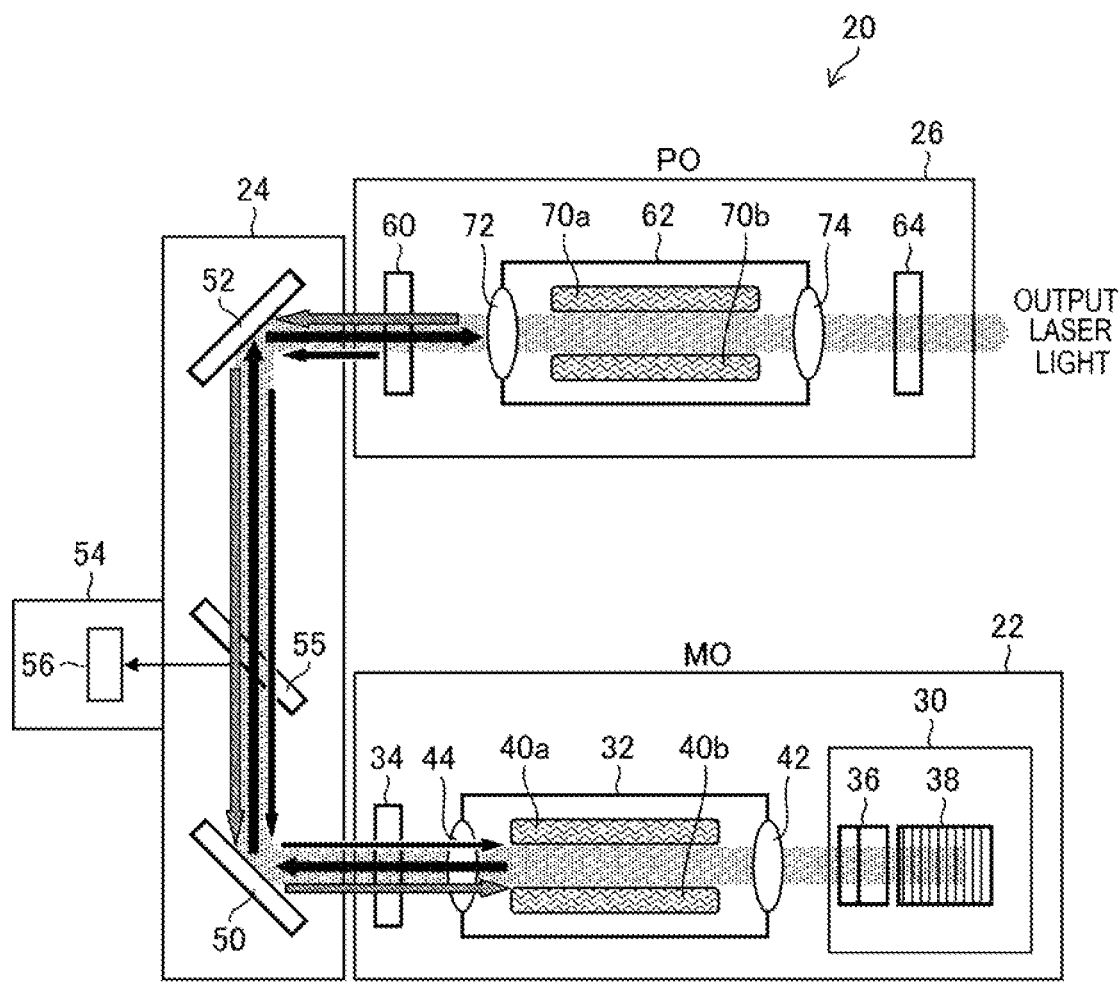
FIG. 2 is shows problems with the ultraviolet laser apparatus according to Comparative Example.

FIG. 2 shows problems with the ultraviolet laser apparatus 20 according to Comparative Example. When the light returning from the PO 26 returns to the MO22, the laser performance deteriorates. The term "return light" used herein refers to the sum of two types of light: MO return light; and PO passage light. The light having exited out of the MO 22 enters the PO 26, and part of the light incident on the rear mirror 60 does not travel toward the interior of the PO 26 but returns directly toward the MO 22 because the rear mirror 60 in the PO 26 is a partially reflective mirror (having reflectance ranging from 50% to 90%). The light that does not travel into the chamber 62 of the PO 26 but is reflected off the rear mirror 60 and returns toward the MO 22 is called "MO return light".

On the other hand, the light having entered the PO 26 from the MO 22 and passed through the rear mirror 60 is caused to resonate and amplified in the PO 26 and exits out thereof. As described above, since the rear mirror 60 in the PO 26 is a partially reflective mirror, part of the light having entered the chamber 62 of the PO 26 and having been amplified therein undesirably returns to the MO 22. The light amplified in the PO 26, passing through the rear mirror 60, and returning to the MO 22 is called "PO passage light".

The return light becomes a heat load on the LNM 30 and other components and may cause deterioration in the linewidth stability, pulse energy stability, and other factors. To suppress the return light that enters the MO 22, it is conceivable to dispose an optical isolator between the MO 22 and the PO 26.

Figure 3:
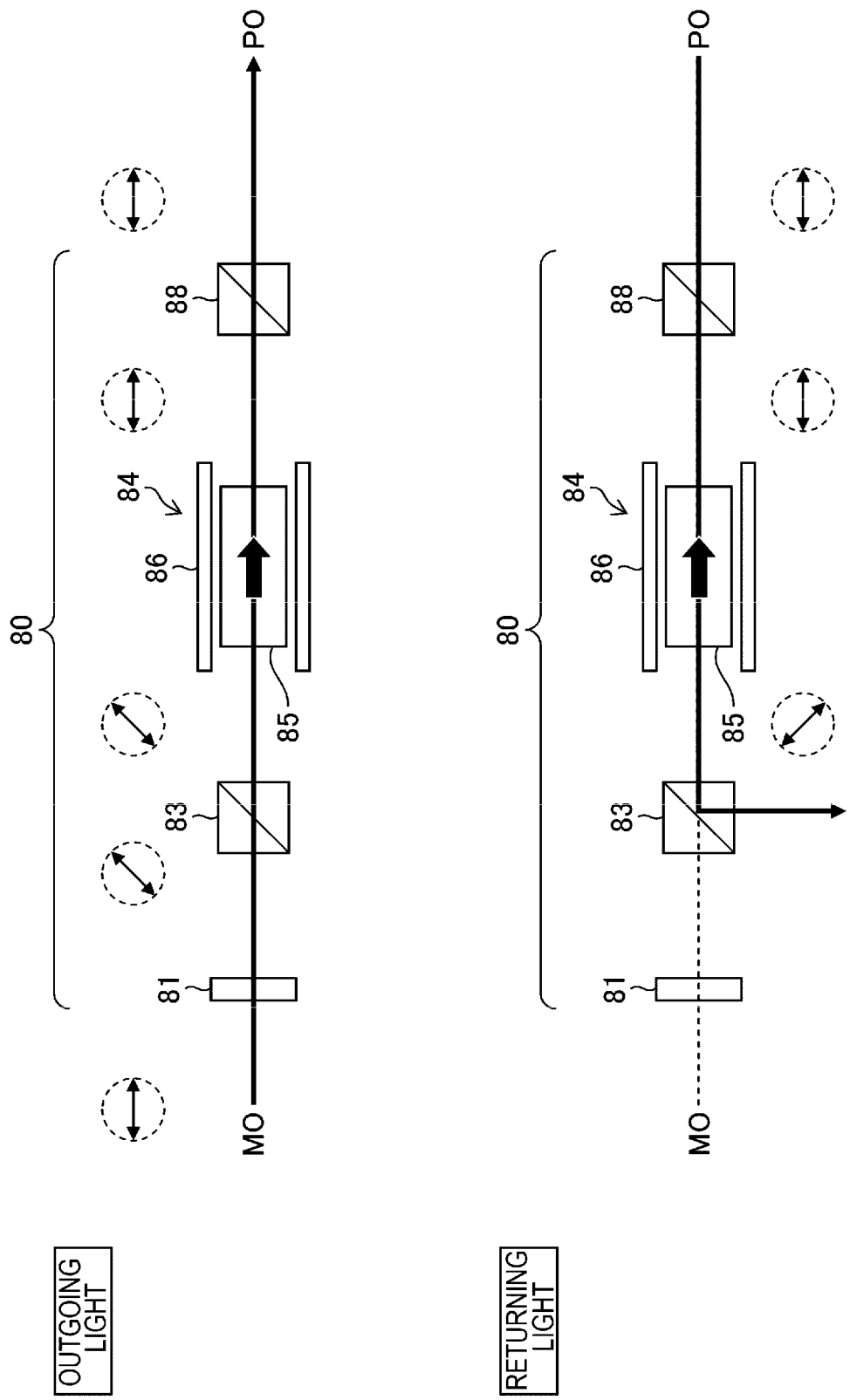
FIG. 3 schematically shows the configuration of an optical isolator according to Comparative Example, which suppresses return light.

FIG. 3 shows an example of the configuration of an optical isolator 80 according to Comparative Example, which suppresses the return light. The upper portion of FIG. 3 shows how the optical isolator 80 affects the pulse laser light traveling from the MO 22 toward the PO 26 (MO injection light: outgoing light). The lower portion of FIG. 3 shows how the optical isolator 80 affects the laser light traveling from the PO 26 toward the MO 22 (return light).

The optical isolator 80 includes a half-wave plate 81, a first polarizer 83, a Faraday rotator 84, and a second polarizer 88 arranged in this order from the side facing the MO 22. The Faraday rotator 84 includes a Faraday material 85 and a magnet 86. In FIG. 3, the rightward arrow shown in the Faraday rotator 84 represents the direction of the magnetic field produced by the magnet 86. The arrows facing opposite sides shown in each broken-line circle in FIG. 3 represent the direction of the polarization plane of the pulse laser light viewed in the traveling direction of the pulse laser light, that is, the polarization direction. The same holds true for FIG. 4.

As shown in the upper portion of FIG. 3, horizontally polarized linearly polarized pulse laser light is output from the MO 22. The half-wave plate 81 rotates the polarization direction of the horizontally polarized pulse laser light output from the MO 22 by 45 degrees in the counterclockwise direction. The first polarizer 83 has a transmission axis parallel to the polarization direction of the pulse laser light having exited out of the half-wave plate 81, so that the pulse laser light having exited out of the half-wave plate 81 passes through the first polarizer 83.

The polarization direction of the pulse laser light having passed through the first polarizer 83 is rotated by the Faraday rotator 84, to which the magnetic field is applied, by 45 degrees in the clockwise direction. The pulse laser light having exited out of the Faraday rotator 84 is thus horizontally polarized. The second polarizer 88 has a transmission axis parallel to the polarization direction of the pulse laser light having exited out of the Faraday rotator 84, so that the pulse laser light having exited out of the Faraday rotator 84 passes through the second polarizer 88 and then enters the PO 26.

The half-wave plate 81 adjusts the polarization direction of the pulse laser light from the MO 22 in such a way that the polarization direction of the pulse laser light output from the MO 22 is the same as the polarization direction of the pulse laser light that enters the PO 26. The other modules that depend on the polarization direction therefore do not need to be changed.

On the other hand, the return light from the PO 26 passes through the second polarizer 88 with the same polarization direction as that of the light entering the PO 26, and the Faraday rotator 84, to which the magnetic field is applied, rotates the polarization direction by 45 degrees in the clockwise direction, as shown in the lower portion of FIG. 3. The polarization direction of the return light having passed through the Faraday rotator 84 is perpendicular to the transmission axis of the first polarizer 83, so that the return light is reflected off the first polarizer 83 and does not enter the MO 22.

The half-wave plate 81 in the optical isolator 80 according to Comparative Example has low durability when used at short wavelengths such as the wavelengths of the light from excimer lasers, and therefore has a difficulty being used in a stable manner over a long period of time.

4. First embodiment

4.1 Configuration

Figure 4:
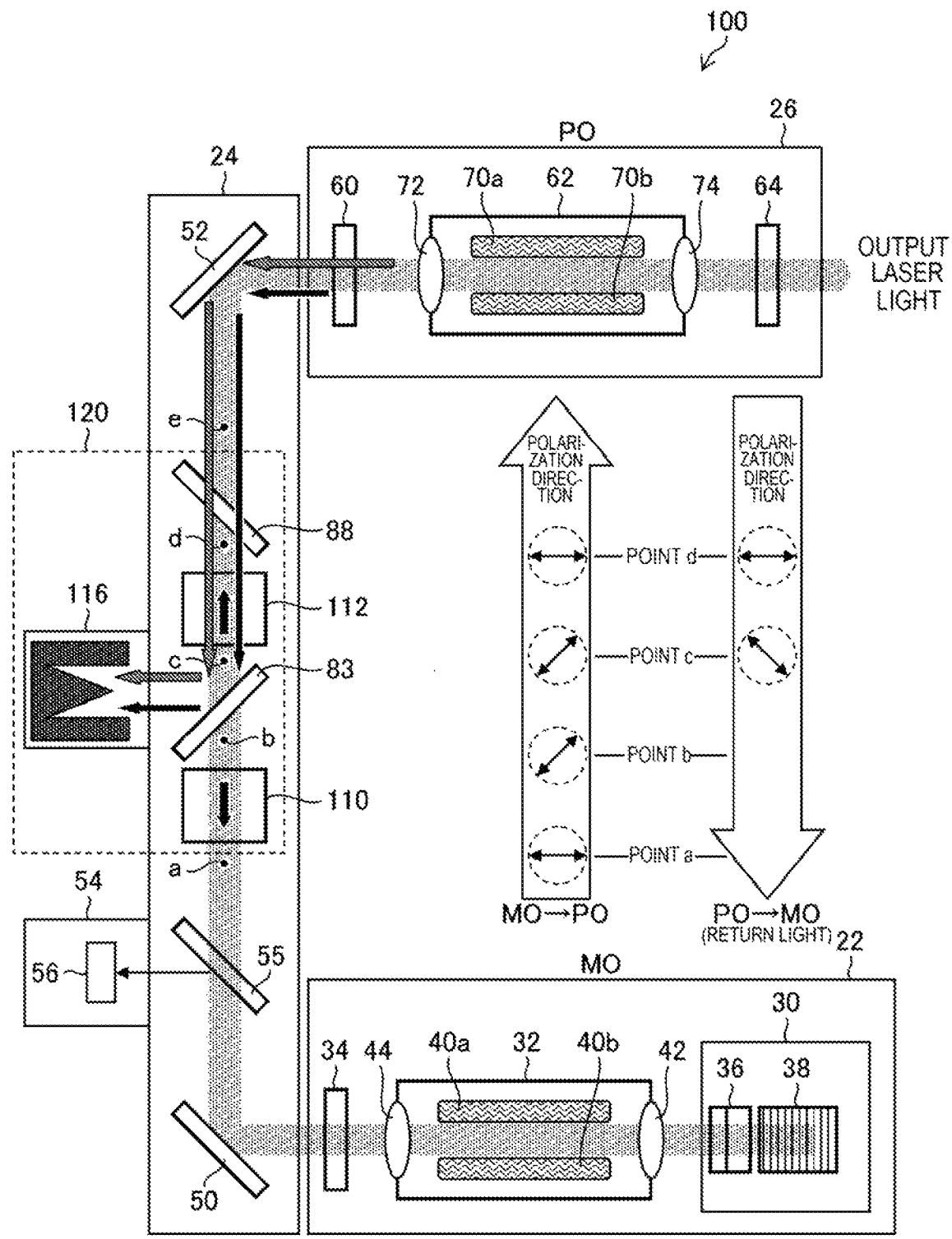
FIG. 4 schematically shows the configuration of an ultraviolet laser apparatus according to a first embodiment.

FIG. 4 schematically shows an example of the configuration of an ultraviolet laser apparatus 100 according to a first embodiment. Differences in configuration between FIGS. 4 and 1 will be described. The ultraviolet laser apparatus 100 differs from the ultraviolet laser apparatus in FIG. 1 in terms of configuration in that an optical isolator 120 including a first Faraday rotator 110 and a second Faraday rotator 112 is disposed between the MO 22 and the PO 26. The optical isolator 120 includes the first Faraday rotator 110, the first polarizer 83, the second Faraday rotator 112, and the second polarizer 88 arranged in this order along the optical path along which the laser light travels from the MO 22 to the PO 26.

The first Faraday rotator 110 and the second Faraday rotator 112 each have a magnet that reverses the orientation of the applied magnetic field so that the polarization direction is rotated in the opposite direction. The direction of the magnetic field applied to the first Faraday rotator 110 shown in FIG. 4 (direction indicated by downward arrow in FIG. 4) is an example of the "first direction" in the present disclosure. The direction of the magnetic field applied to the second Faraday rotator 112 shown in FIG. 4 (direction indicated by upward arrow in FIG. 4) is an example of the "second direction" in the present disclosure.

Figures 5, 6, 7:
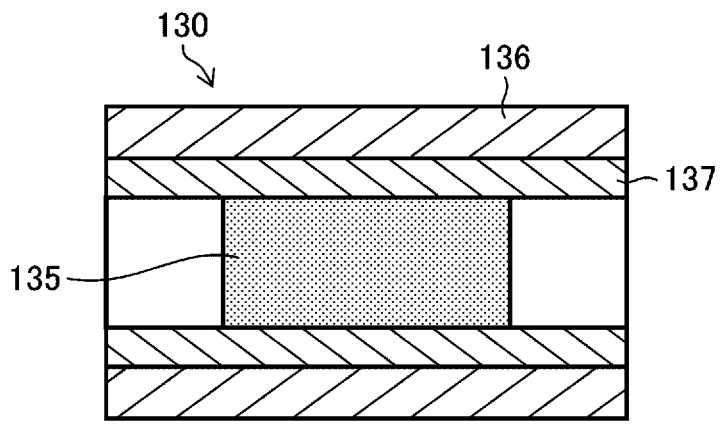
FIG. 5 is a cross-sectional view schematically showing the configuration of a Faraday rotator.
FIG. 6 is a table showing a preferred range of a magnetic field and the thickness of a Faraday material in a case where the wavelength of pulse laser light is the wavelength at which an ArF excimer laser oscillates.
FIG. 7 is a table showing a preferred range of the magnetic field and the thickness of the Faraday material in a case where the wavelength of the pulse laser light is the wavelength at which a KrF excimer laser oscillates.

The Faraday material, size, and magnetic field of each of the first Faraday rotator 110 and the second Faraday rotator 112 are so selected that the Faraday rotator rotates the polarization direction by 45 degrees. Preferable selection conditions will be described later in detail (FIGS. 5 to 7).

The optical isolator 120 further includes a damper 116 for return light termination. The damper 116 is so disposed that the return light reflected off the first polarizer 83 enters the damper 116. The other configurations may be the same as those in FIG. 1.

FIG. 4 further shows the polarization direction of the pulse laser light at locations labeled with points a, b, c, and d on the optical path between the MO 22 and the PO 26. FIG. 4 shows the polarization direction, at the locations labeled with the points a to d, of the pulse laser light propagating from the MO 22 toward the PO 26, and the polarization direction, at the locations labeled with points d and c, of the return light traveling from the PO 26 toward the MO 22.

4.2 Operation

The pulse laser light propagating in the direction from the MO 22 to the PO 26 will first be described. The polarization direction of the pulse laser light output from the MO 22 and polarized in a specific direction (point a) is rotated by the first Faraday rotator 110 by 45 degrees in the counterclockwise direction (point b). The counterclockwise direction is an example of the "first rotation direction" in the present disclosure, and 45 degrees is an example of the "first angle" in the present disclosure.

The first polarizer 83 is so disposed that the transmission axis thereof is parallel to the polarization direction of the pulse laser light having exited out of the first Faraday rotator 110, so that the pulse laser light having a polarization direction rotated by the first Faraday rotator 110 passes through the first polarizer 83 (point c).

The pulse laser light having passed through the first polarizer 83 enters the second Faraday rotator 112, and the polarization direction thereof is rotated by the second Faraday rotator 112 by 45 degrees in the clockwise direction (point d). The clockwise direction is an example of the "second rotation direction" in the present disclosure, and 45 degrees is an example of the "second angle" in the present disclosure. The pulse laser light having a polarization direction rotated by the second Faraday rotator 112 passes through the second polarizer 88. The polarization direction, at the point a, of the pulse laser light traveling from the MO 22 to the PO 26 is the same as the polarization direction at a point e.

The pulse laser light returning from the PO 26 toward the MO 22 will next be described. At the point e in FIG. 4, the polarization direction of the pulse laser light propagating from the MO 22 toward the PO 26 is the same as the polarization direction of the pulse laser light returning from the PO 26 toward the MO 22 (return light). The return light traveling from the PO 26 toward the MO 22 therefore passes through the second polarizer 88.

The polarization direction of the return light having passed through the second polarizer 88 is then rotated by the second Faraday rotator 112 by 45 degrees in the clockwise direction (point c). At the point c, the polarization direction of the pulse laser light propagating from the MO 22 toward the PO 26 is perpendicular to the polarization direction of the pulse laser light returning from the PO 26 toward the MO 22. The pulse laser light returning from the PO 26 toward the MO 22 is therefore reflected off the first polarizer 83 and enters the damper 116. The damper 116 absorbs and blocks the light reflected off the first polarizer 83.

4.3 Specific Example of Faraday Rotators

FIG. 5 is a cross-sectional view schematically showing an example of the configuration of a Faraday rotator 130. The Faraday rotator 130 can be used as each of the first Faraday rotator 110 and the second Faraday rotator 112. The Faraday rotator 130 includes a Faraday material 135 and a magnet 136. The Faraday material 135 is a material that is transparent at the ultraviolet wavelengths and has a large Verdet constant. The term "transparent" means being light transmissive.

The Verdet constant depends on the type of the material and the wavelength. For example, Calcium fluoride ($CaF_2$), synthetic quartz ($SiO_2$), and magnesium fluoride ($MgF_2$) are suitable as the Faraday material 135. The Faraday material 135 is held in a holder 137.

The magnet 136 has a hollow structure, which houses the Faraday material 135 via the holder 137. The direction of the magnetic field passing through the Faraday material 135 is parallel to the light propagation direction. The direction in which the Faraday rotator 130 rotates the polarization plane (polarization direction) depends on the sign of the Verdet constant and the direction of the applied magnetic field.

FIG. 6 shows a preferable range of the magnetic field and the thickness of the Faraday material 135 in a case where the wavelength of the pulse laser light is the wavelength at which an ArF excimer laser oscillates. The wavelength at which an ArF excimer laser oscillates includes a wavelength of approximately 193 nm. FIG. 6 shows cases where the Faraday material 135 is $CaF_2$ and $SiO_2$. The thickness of the Faraday material 135 is evaluated by the thickness in the optical axis direction.

FIG. 7 shows a preferable range of the magnetic field and the thickness of the Faraday material 135 in a case where the wavelength of the pulse laser light is the wavelength at which a KrF excimer laser oscillates. The wavelength at which a KrF excimer laser oscillates includes a wavelength of approximately 248 nm. FIG. 7 shows cases where the Faraday material 135 is $CaF_2$ and $SiO_2$.

The preferable ranges shown in FIGS. 6 and 7 have been selected based on how readily the magnetic field is achieved. The most preferable range of the magnetic field is the magnetic flux density provided when a neodymium magnet or any other magnet that produces a large magnetic force is used. The Faraday material 135 has a thickness that rotates the polarization plane by 45 degrees, the thickness calculated based on the selected material, the selected magnetic flux density of the magnetic field, and the Verdet constant.

As shown in FIG. 6, when the Faraday material 135 is calcium fluoride and the wavelength of the pulse laser light is the wavelength at which an ArF excimer laser oscillates, the magnitude of the magnetic field applied to the Faraday rotator 130 and the thickness of the Faraday material 135 in the optical axis direction preferably range from 0.5 T to 3.0 T and from 6 mm to 40 mm, respectively. The magnitude and the thickness more preferably range from 0.75 T to 2.9 T and from 10 mm to 30 mm, and most preferably range from 0.8 T to 1.5 T and from 15 mm to 25 mm. The notation indicating any of the numerical ranges, such as "0.5 T to 3.0 T", indicates a range including the numerical values shown before and after "to". For example, the notation "0.5 T to 3.0 T" means "greater than or equal to 0.5 T but smaller than or equal to 3.0 T".

When the Faraday material 135 is synthetic quartz and the wavelength of the pulse laser light is the wavelength at which the ArF excimer laser oscillates, the magnitude of the magnetic field applied to the Faraday rotator 130 and the thickness of the Faraday material 135 in the optical axis direction preferably range from 0.5 T to 3 T and from 3 mm to 25 mm, respectively. The magnitude and the thickness more preferably range from 0.75 T to 2.9 T and from 6 mm to 20 mm, and most preferably range from 0.8 T to 1.5 T and from 8 mm to 15 mm.

As shown in FIG. 7, when the Faraday material 135 is calcium fluoride and the wavelength of the pulse laser light is the wavelength at which a KrF excimer laser oscillates, the magnitude of the magnetic field applied to the Faraday rotator 130 and the thickness of the Faraday material 135 in the optical axis direction preferably range from 0.5 T to 3.0 T and from 13 mm to 83 mm, respectively. The magnitude and the thickness more preferably range from 0.75 T to 2.9 T and from 20 mm to 55 mm, and most preferably range from 0.8 T to 1.5 T and from 30 mm to 50 mm.

When the Faraday material 135 is synthetic quartz and the wavelength of the pulse laser light is 248 nm, which is the wavelength at which the KrF excimer laser oscillates, the magnitude of the magnetic field applied to the Faraday rotator 130 and the thickness of the Faraday material 135 in the optical axis direction preferably range from 0.5 T to 3.0 T and from 8 mm to 53 mm, respectively. The magnitude and the thickness more preferably range from 0.75 T to 2.9 T and from 10 mm to 40 mm, and most preferably range from 0.8 T to 1.5 T and from 15 mm to 30 mm.

The Faraday material 135 may be divided into a plurality of pieces, and the total thickness of the pieces may satisfy any of the ranges described above. The number of pieces to which the material is divided may, for example, be two, three, or four. The first Faraday rotator 110 and the second Faraday rotator 112 may differ from each other in terms of the Faraday material, the thickness in the optical axis direction, the magnitude of the magnetic field, and other factors. On the other hand, using the first Faraday rotator 110 and the second Faraday rotator 112 having the same Faraday material, thickness in the optical axis direction, and magnitude of the magnetic field provides a configuration in which the polarization plane is rotated in opposite directions by the same amount (angle) of rotation, which is a preferable configuration that is readily handled.

4.4 Allowable Angular Difference between Transmission Axis of Polarizer and Polarization Direction of Laser Light It is most preferable that the transmission axes of the first polarizer 83 and the second polarizer 88 are parallel to the polarization direction of the pulse laser light that enters the polarizers, but the transmission axes and the polarization direction are not necessarily parallel to each other in an exact sense, and an angular difference therebetween is acceptable to the extent that the difference still allows intended functions of the polarizers in practical use.

Figure 8:
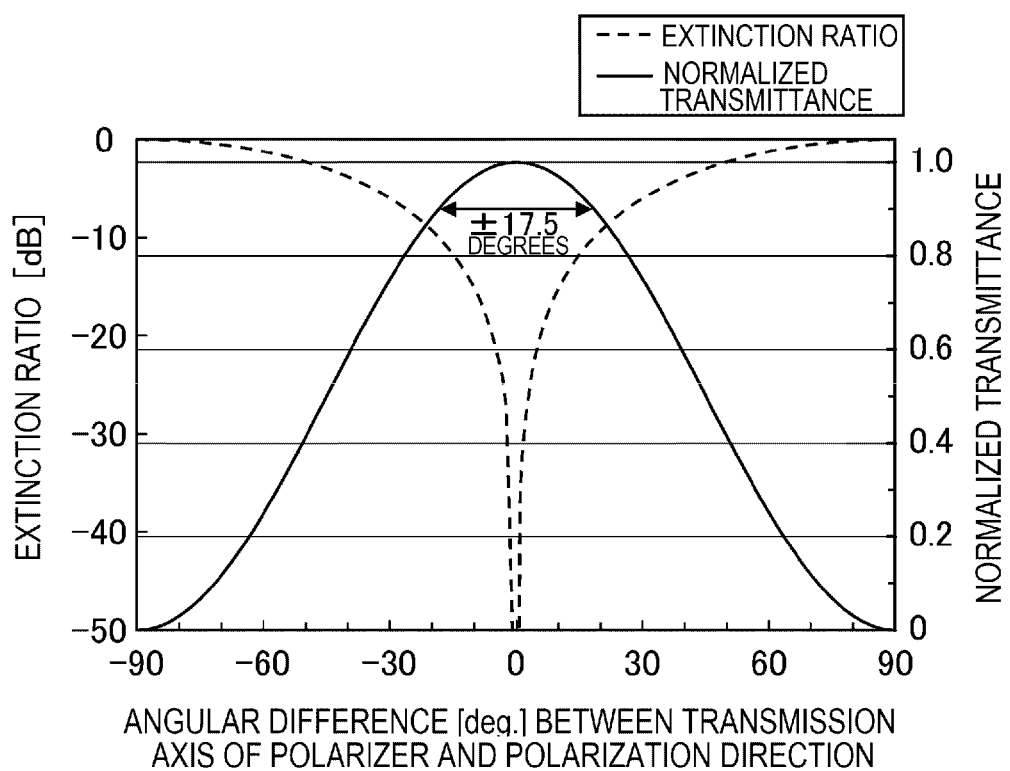
FIG. 8 shows a graph indicating the relationship of an angular difference between a transmission axis of a polarizer and a polarization direction of the pulse laser light with an extinction ratio, and a graph of the extinction ratio converted into normalized transmittance.

FIG. 8 shows a graph indicating the relationship of the angular difference between the transmission axis of a polarizer and the polarization direction of the pulse laser light with an extinction ratio (dB), and a graph of the extinction ratio converted into normalized transmittance. The left vertical axis of FIG. 8 represents the extinction ratio, and the right vertical axis of FIG. 8 represents the normalized transmittance. The normalized transmittance is a value so normalized that the transmittance at an angular difference of 0 degrees is 1.0. The first polarizer 83, through which the pulse laser light having exited out of the first Faraday rotator 110 passes, and the second polarizer 88, through which the pulse laser light having exited out of the second Faraday rotator 112 passes, can practically function effectively enough when the normalized transmittance of the incident pulse laser light is greater than or equal to 0.9. FIG. 8 therefore shows that the preferable allowable range of the angular difference between the transmission axis of the first polarizer 83 or the second polarizer 88 and the polarization direction of the pulse laser light is ±17.5 degrees, over which the normalized transmittance is greater than or equal to 0.9.

4.5 Effects and Advantages

In the ultraviolet laser apparatus 100 according to the first embodiment, the polarization direction of the pulse laser light is allowed to remain the same before and after the pulse laser light passes through the optical isolator 120 without use of the half-wave plate 81, which has low durability when used at short wavelengths. The amount of return light can thus be suppressed without any change of other modules that depend on the polarization direction.

In the ultraviolet laser apparatus 100 according to the first embodiment, the pulse laser light returning from the PO 26 toward the MO 22 is reflected off the first polarizer 83 and absorbed by the damper 116, so that the entry of the return light into the MO 22 is suppressed. The heat load on the MO 22 is thus reduced, and the energy stability, the linewidth stability, and other factors are improved as compared with those in the configuration of Comparative Example.

4.6 Variations

The MO pulse energy monitor 54 can be disposed either upstream or downstream from the optical isolator 120, in which the first Faraday rotator 110 and the second Faraday rotator 112 are disposed in a tandem arrangement, and it is preferable to employ the configuration in which the MO pulse energy monitor 54 is disposed upstream from the optical isolator 120, as shown in FIG. 4. The MO pulse energy monitor 54 is an example of the "energy monitor" in the present disclosure. The directions of the magnetic fields applied to the first Faraday rotator 110 and the second Faraday rotator 112 may only need to be opposite to each other, but are not limited to those in the example shown in FIG. 4. For example, the first Faraday rotator 110 and the second Faraday rotator 112 may be so configured that the direction of the magnetic field applied to the first Faraday rotator 110 is upward in FIG. 4 and the direction of the magnetic field applied to the second Faraday rotator 112 is downward in FIG. 4.

FIG. 4 describes an example in which the first Faraday rotator 110 and the second Faraday rotator 112 rotate the polarization plane by the same angle of rotation (45 degrees) in opposite directions, but the angle of rotation of the polarization direction rotated by the first Faraday rotator 110 and the angle of rotation of the polarization direction rotated by the second Faraday rotator 112 are not necessarily the same angle in opposite directions, and an angular difference between the two angles of rotation is acceptable to the extent that the intended functions of the polarizers in practical use can be provided. FIG. 8 shows that the angle of rotation in the first rotation direction performed by the first Faraday rotator 110 and the angle of rotation in the second rotation direction (opposite direction to first rotation direction) performed by the second Faraday rotator 112 are allowed to differ from each other by a value smaller than or equal to 17.5 degrees.

The angle of rotation in the first rotation t direction performed by the first Faraday rotator 110 may be within a range of 45±17.5 degrees, and similarly, the angle of rotation in the second rotation direction performed by the second Faraday rotator 112 may be within a range of 45±17.5 degrees. The configuration in which the polarization direction of the pulse laser light passing through the first Faraday rotator 110 and entering the first polarizer 83 and the polarization direction of the pulse laser light returning from the PO 26, passing through the second Faraday rotator 112, and entering the first polarizer 83 intersect with each other at an angle within a range of 90±17.5 degrees causes the return light to be reflected off the first polarizer 83, so that the entry of the return light into the MO 22 is suppressed.

5. Second embodiment 5.1 Configuration

Figure 9:
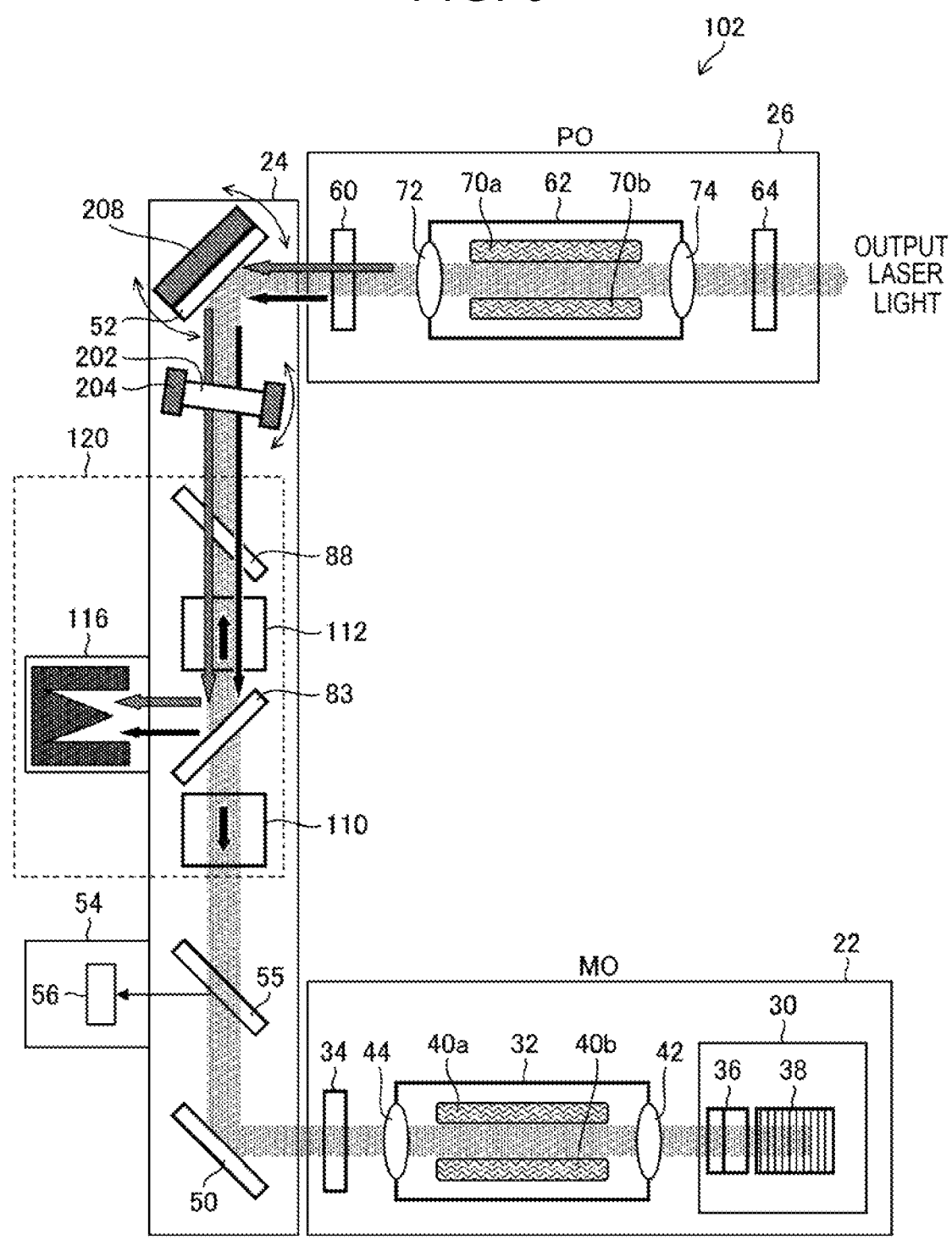
FIG. 9 schematically shows the configuration of an ultraviolet laser apparatus according to a second embodiment.

FIG. 9 schematically shows the configuration of an ultraviolet laser apparatus 102 according to a second embodiment. Differences in configuration between FIGS. 9 and 4 will be described. The ultraviolet laser apparatus 102 shown in FIG. 9 differs in configuration from the ultraviolet laser apparatus 100 shown in FIG. 4 in that a plane-parallel substrate 202, which can perform adjustment around two axes, and a highly reflective mirror 52, which can perform adjustment around two axes, are disposed on the optical path between the second polarizer 88 and the PO 26. The plane-parallel substrate 202 is held by a two-axis angle adjustment holder 204, which allows angular adjustment around axes of rotation that are two axes perpendicular to each other.

The plane-parallel substrate 202 is disposed on the optical path between the second polarizer 88 and the highly reflective mirror 52. The plane-parallel substrate 202 may be a substrate made of calcium fluoride. The two-axis angle adjustment holder 204 may, for example, be a holder that allows angular adjustment around an axis of rotation that is an axis perpendicular to the plane of view of FIG. 9, and around an axis of rotation that is an axis parallel to the substrate surface of the plane-parallel substrate 202 and the plane of view of FIG. 9.

The highly reflective mirror 52 is held by a two-axis angle adjustment holder 208, which allows angular adjustment around axes of rotation that are two axes perpendicular to each other. The two-axis angle adjustment holder 208 may, for example, be a holder that allows angular adjustment around an axis of rotation that is an axis perpendicular to the plane of view of FIG. 9, and around an axis of rotation that is an axis parallel to the reflection surface of the highly reflective mirror 52 and the plane of view of FIG. 9.

5.2 Operation

The optical axis is adjusted by adjustment of the plane-parallel substrate 202, which allows adjustment around two axes, and the highly reflective mirror 52, which allows adjustment around two axes, in such a way that the pulse laser light from the MO 22 most efficiently enters the PO 26.

The plane-parallel substrate 202, which allows adjustment around two axes, is adjusted to shift the pulse laser light from the MO 22 in parallel to the traveling direction thereof so that the pulse laser light most efficiently enters the PO 26.

The highly reflective mirror 52, which allows adjustment around two axes, is adjusted to change the angle of the pulse laser light output from the MO 22 and entering the PO 26 so that the pulse laser light most efficiently enters the PO 26.

The two-axis angle adjustment holder 204 and the two-axis angle adjustment holder 208 are each an example of the "optical axis adjustment mechanism" in the present disclosure. The configuration including both the plane-parallel substrate 202, which allows adjustment around two axes, and the highly reflective mirror 52, which allows adjustment around two axes, is a preferable embodiment, but it is also conceivable to include only one of the components described above.

5.3 Effects and Advantages

The second embodiment can provide the same effects as those provided by the first embodiment. The second embodiment further allows the optical axis of the injection light entering the PO 26 to be adjusted more readily than in the first embodiment.

6. Third embodiment 6.1 Configuration

Figure 10:
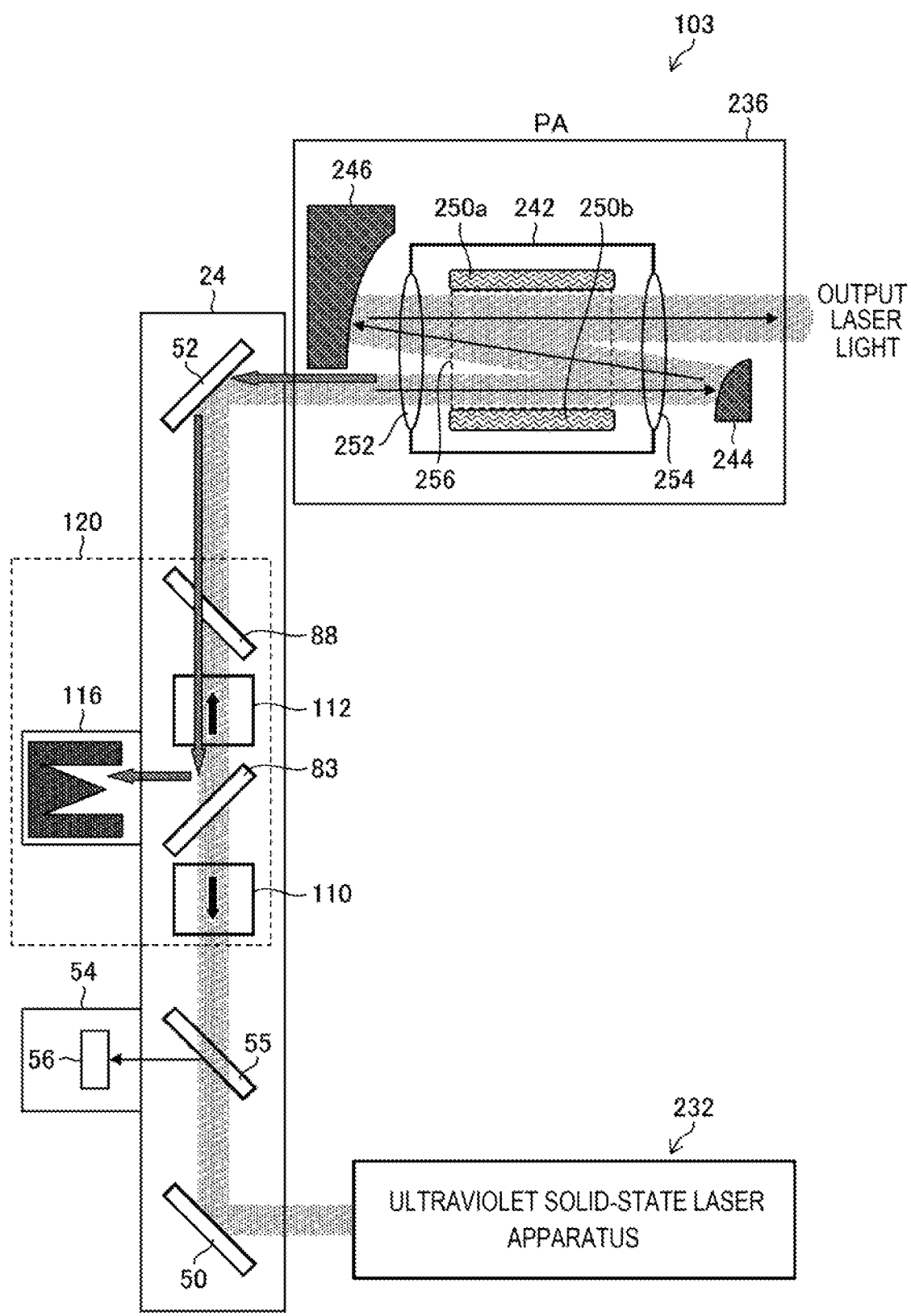
FIG. 10 schematically shows the configuration of an ultraviolet laser apparatus according to a third embodiment.

FIG. 10 schematically shows the configuration of an ultraviolet laser apparatus 103 according to a third embodiment. Differences in configuration between FIGS. 10 and 4 will be described. The ultraviolet laser apparatus 103 shown in FIG. 10 includes an ultraviolet solid-state laser apparatus 232 as an oscillation-stage laser in place of the MO 22 in FIG. 4, and an excimer amplifier 236 in place of the PO 26. The other configurations may be the same as those in FIG. 4.

The ultraviolet solid-state laser apparatus 232 outputs, for example, fourth, fifth, or sixth harmonic (having wavelength ranging from 150 nm to 380 nm) of a fundamental wave from the solid-state laser that belongs to a near-infrared band (wavelengths ranging from 780 nm to 2500 nm). For example, the ultraviolet solid-state laser apparatus 232 outputs seed light having a wavelength of about 193 nm and is so disposed that the seed light enters the excimer amplifier 236.

As an example, the ultraviolet solid-state laser apparatus 232 may include a semiconductor laser system, a titanium sapphire amplifier, and a wavelength conversion system. The semiconductor laser system may include a distributed feedback (DFB) semiconductor laser that outputs CW laser light having a wavelength of about 773.6 nm, and a semiconductor optical amplifier (SOA) that converts the CW laser light into pulse laser light. The wavelength conversion system contains a plurality of nonlinear optical crystals, converts the wavelength of the incident pulse laser light, and outputs fourth-harmonic pulse laser light. The wavelength conversion system contains, for example, an LBO crystal and a KBBF crystal. The LBO crystal is a nonlinear optical crystal expressed by a chemical formula $LiB_3O_5$. The KBBF crystal is a nonlinear optical crystal expressed by a chemical formula $KBe_2BO_3F_2$.

The excimer amplifier 236 includes a chamber 242, a convex cylindrical mirror 244, and a concave cylindrical mirror 246.

The chamber 242 includes a pair of discharge electrodes 250a and 250b, and two windows 252 and 254, which transmit the laser light. The discharge electrodes 250a and 250b are disposed to face each other with a discharge space 256 therebetween. The space between the discharge electrodes 250a and 250b is the discharge space 256. The direction in which the discharge electrodes 250a and 250b face each other with the discharge space 256 therebetween corresponds to a discharge direction. The chamber 242 is filled with the same laser gas as the laser gas described in FIG. 4.

The convex surface of the convex cylindrical mirror 244 and the concave surface of the concave cylindrical mirror 246 are each coated with a highly reflective film for the wavelength of approximately 193 nm.

The convex cylindrical mirror 244 and the concave cylindrical mirror 246 are so disposed that the seed light from the ultraviolet solid-state laser apparatus 232 passes through the discharge space 256 of the excimer amplifier 236 three times to be expanded in the discharge direction and amplified.

6.2 Operation

The seed light output from the ultraviolet solid-state laser apparatus 232 passes through the optical isolator 120 and enters the excimer amplifier 236. The seed light having entered the excimer amplifier 236 and having the wavelength of about 193.4 nm is reflected off the convex cylindrical mirror 244 and the concave cylindrical mirror 246 to pass three times through the discharge space 256 between the discharge electrodes 250a and 250b. The seed light beam is therefore enlarged and amplified. The excimer amplifier 236 is an example of the "multi-pass amplifier" in the present disclosure. The three-pass excimer amplifier 236 is not necessarily used, and any of a variety of types of multi-pass amplifiers can be used.

The operation of the optical isolator 120 is the same as that in the first embodiment described with reference to FIG. 4. The optical isolator 120 suppresses entry of amplified spontaneous emission (ASE) and other types of light generated by the excimer amplifier 236 into the ultraviolet solid-state laser apparatus 232.

6.3 Effects and Advantages

The ultraviolet laser apparatus 103 according to the third embodiment allows the polarization direction to be the same before and after the pulse laser light passes through the optical isolator 120 without use of the half-wave plate 81, which has low durability when used at short wavelengths. The amount of return light can thus be suppressed without any change of other modules that depend on the polarization direction.

In the ultraviolet laser apparatus 103 according to the third embodiment, the light returning from the excimer amplifier 236 toward the ultraviolet solid-state laser apparatus 232 does not enter the ultraviolet solid-state laser apparatus 232, so that the heat load on the ultraviolet solid-state laser apparatus 232 is reduced, and the energy stability, the linewidth stability, and other factors are improved as compared with those of the configuration in Comparative Example.

7. Fourth embodiment

7.1 Configuration

Figure 11:
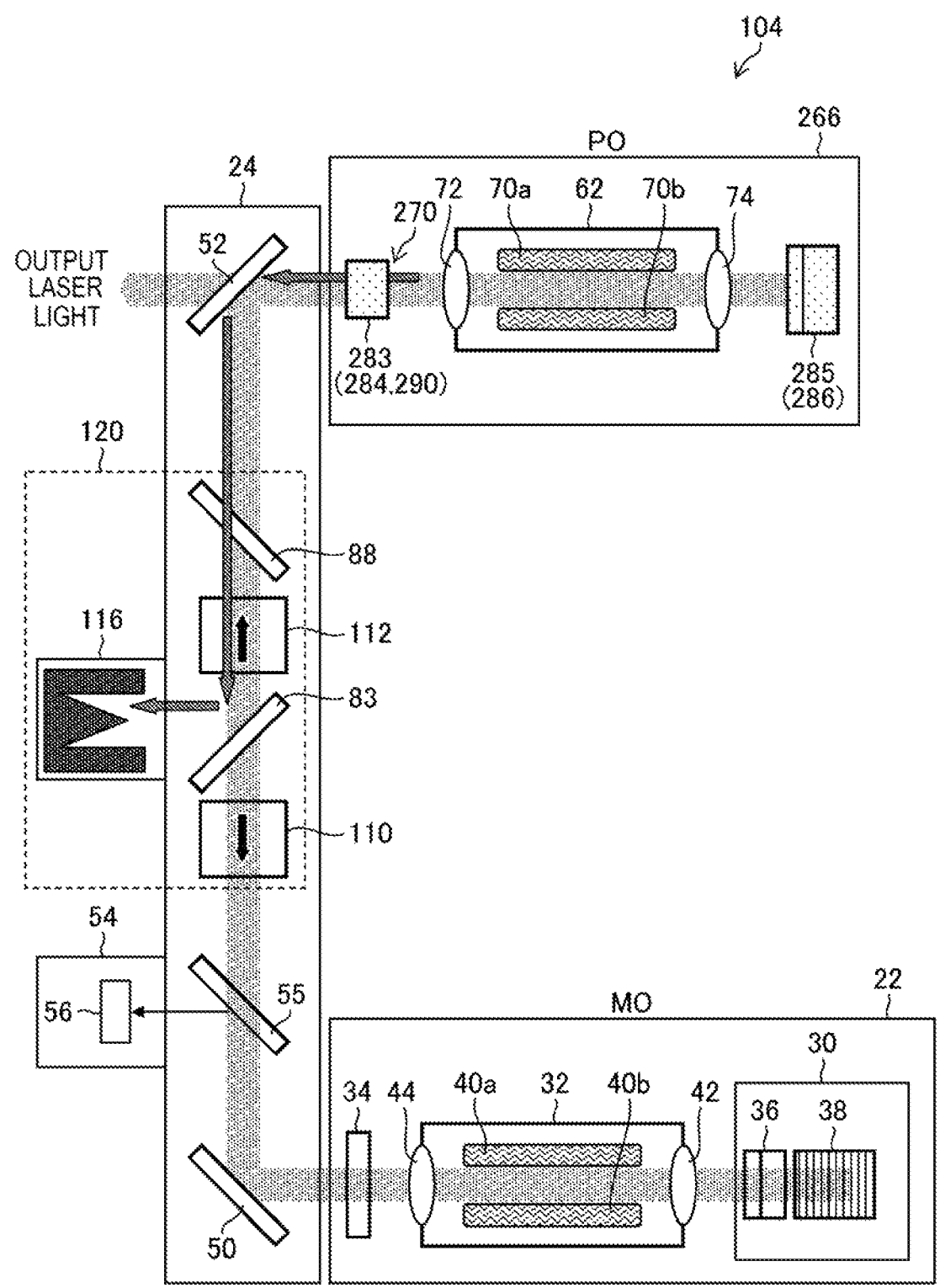
FIG. 11 schematically shows the configuration of an ultraviolet laser apparatus according to a fourth embodiment.

FIG. 11 schematically shows the configuration of an ultraviolet laser apparatus 104 according to a fourth embodiment. Differences in configuration between FIGS. 11 and 4 will be described. The ultraviolet laser apparatus 104 according to the fourth embodiment differs from that according to the first embodiment in terms of the configuration of the amplification-stage laser and the configuration of the highly reflective mirror that introduces the laser light from the MO 22 into the amplification-stage laser.

The amplification-stage laser in the first embodiment shown in FIG. 4 is the PO 26 including the Fabry-Perot-type optical resonator having the rear mirror 60 and the output coupling mirror 64, whereas the amplification-stage laser in the fourth embodiment shown in FIG. 11 is a PO 266 including a ring resonator 270.

Figure 12:
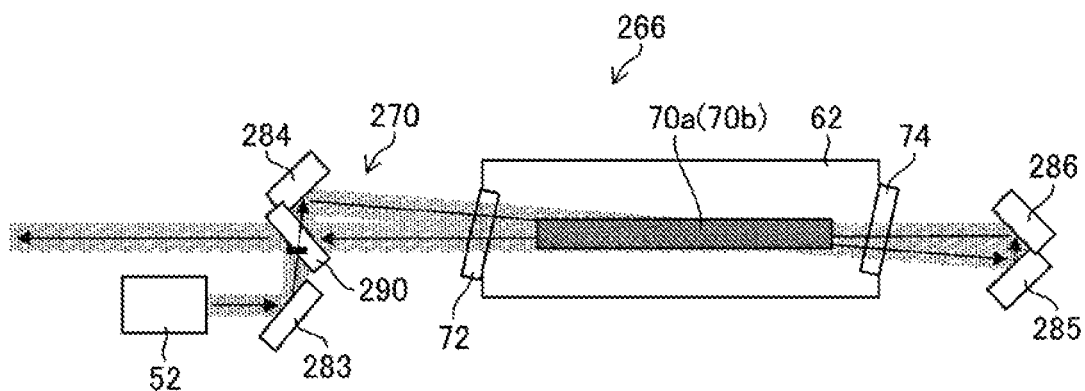
FIG. 12 is a top view schematically showing the configuration of an amplification-stage laser used in the fourth embodiment.

FIG. 12 is a top view schematically showing the configuration of the PO 266 used in the fourth embodiment. The ring resonator 270 includes a highly reflective mirror 284, a highly reflective mirror 285, a highly reflective mirror 286, and a partially reflective mirror 290.

In the ultraviolet laser apparatus 104, a highly reflective mirror 283 is disposed to introduce the laser light output from the MO 22 and reflected off the highly reflective mirrors 50 and 52 into the ring resonator 270. The highly reflective mirror 283 is disposed on the optical path between highly reflective mirror 52 and the partially reflective mirror 290 so that the laser light reflected off the highly reflective mirror 52 is incident on the partially reflective mirror 290.

7.2 Operation

The laser light output from the MO 22 is reflected sequentially off the highly reflective mirrors 50, 52, and 283, and then enters the ring resonator 270 via the partially reflective mirror 290.

The laser light having passed through the partially reflective mirror 290 is reflected off the highly reflective mirror 284 and then enters the chamber 62, where the laser light is amplified, and the amplified laser light is then reflected off the highly reflective mirrors 285 and 286 and again enters the chamber 62, where the laser light is amplified. Thereafter, part of the laser light having exited out of the chamber 62 passes through the partially reflective mirror 290, while the other part is reflected off the partially reflective mirror 290 and amplified again in the ring resonator 270.

The amplified pulse laser light having passed through the partially reflective mirror 290 is output from the ultraviolet laser apparatus 104.

The optical isolator 120 suppresses entry of the return light from the PO 266 into the MO 22. The operation of the optical isolator 120 is the same as that in the first embodiment described with reference to FIG. 4.

7.3 Effects and Advantages

The ultraviolet laser apparatus 104 according to the fourth embodiment can provide the same effects as those provided by the first embodiment.

8. Electronic Device Manufacturing Method

Figure 13:
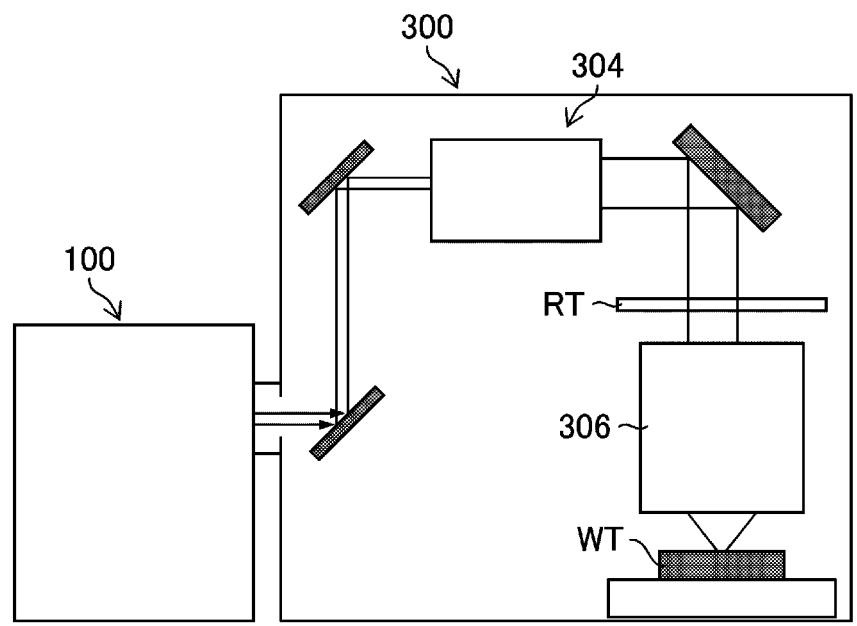
FIG. 13 schematically shows an example of the configuration of an exposure apparatus.

FIG. 13 schematically shows an example of the configuration of an exposure apparatus 300. The exposure apparatus 300 includes an illumination optical system 304 and a projection optical system 306. The illumination optical system 304 illuminates a reticle pattern of a reticle that is not shown but is placed on a reticle stage RT with the laser light having entered the exposure apparatus 300 from the ultraviolet laser apparatus 100. The projection optical system 306 performs reduction projection on the laser light having passed through the reticle to bring the laser light into focus on a workpiece that is not shown but is placed on a workpiece table WT. The workpiece is a photosensitive substrate onto which a photoresist has been applied, such as a semiconductor wafer.

The exposure apparatus 300 translates the reticle stage RT and the workpiece table WT in synchronization with each other to expose the workpiece to the laser light having reflected the reticle pattern. Semiconductor devices can be manufactured by transferring the reticle pattern onto the semiconductor wafer in the exposure step described above and then carrying out a plurality of other steps. The semiconductor devices are an example of the "electronic devices" in the present disclosure. The ultraviolet laser apparatus 100 may be replaced with the ultraviolet laser apparatus 102, 103 or 104 described in the second to fourth embodiments to generate the laser light.

9. Others

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of any thereof and any other than A, B, and C.

What is claimed is:

1. An ultraviolet laser apparatus comprising:
   an oscillation-stage laser configured to output linearly polarized pulse laser light having ultraviolet wavelengths;
   an amplifier configured to amplify the pulse laser light and output the amplified pulse laser light; and
   an optical isolator disposed on an optical path between the oscillation-stage laser and the amplifier,
   the optical isolator including
      a first Faraday rotator configured to rotate a polarization direction of the pulse laser light output from the oscillation-stage laser by a first angle in a first rotation direction with aid of a magnetic field in a first direction,
      a first polarizer so disposed that normalized transmittance for the pulse laser light that exits out of the first Faraday rotator is greater than or equal to 0.9,
      a second Faraday rotator configured to rotate the polarization direction of the pulse laser light passing through the first polarizer by a second angle in a second rotation direction that is an opposite direction to the first rotation direction with aid of a magnetic field in a second direction that is an opposite direction to the first direction, and
      a second polarizer so disposed that the normalized transmittance for the pulse laser light that exits out of the second Faraday rotator is greater than or equal to 0.9.

2. The ultraviolet laser apparatus according to claim 1, wherein
   an angular difference between the polarization direction of the pulse laser light that exits out of the first Faraday rotator and a transmission axis of the first polarizer is smaller than or equal to 17.5 degrees, and
   an angular difference between the polarization direction of the pulse laser light that exits out of the second Faraday rotator and a transmission axis of the second polarizer is smaller than or equal to 17.5 degrees.

3. The ultraviolet laser apparatus according to claim 1, wherein
   an angular difference between the first angle and the second angle is smaller than or equal to 17.5 degrees.

4. The ultraviolet laser apparatus according to claim 1, wherein
   the first and second angles are each within a range of 45±17.5 degrees,
   the polarization direction of the pulse laser light traveling from the oscillation-stage laser toward the amplifier and entering the first polarizer and the polarization direction of the pulse laser light returning from the amplifier toward the oscillation-stage laser, passing through the second Faraday rotator, and entering the first polarizer intersect with each other at an angle within a range of 90±17.5 degrees, and
   the pulse laser light passing through the second Faraday rotator and entering the first polarizer is reflected off the first polarizer.

5. The ultraviolet laser apparatus according to claim 1, wherein
   a magnetic flux density of the magnetic field applied to each of the first Faraday rotator and the second Faraday rotator is greater than or equal to 0.5 T but smaller than or equal to 3.0 T.

6. The ultraviolet laser apparatus according to claim 5, wherein
 a wavelength of the pulse laser light is a wavelength at which an ArF excimer laser oscillates,
 a Faraday material contained in each of the first and second Faraday rotators is calcium fluoride, and
 a thickness of the Faraday material in an optical axis direction is greater than or equal to 6 mm but smaller than or equal to 40 mm.

7. The ultraviolet laser apparatus according to claim 5, wherein
 a wavelength of the pulse laser light is a wavelength at which an ArF excimer laser oscillates,
 a Faraday material contained in each of the first and second Faraday rotators is synthetic quartz, and
 a thickness of the Faraday material in an optical axis direction is greater than or equal to 3 mm but smaller than or equal to 25 mm.

8. The ultraviolet laser apparatus according to claim 5, wherein
 a wavelength of the pulse laser light is a wavelength at which a KrF excimer laser oscillates,
 a Faraday material contained in each of the first and second Faraday rotators is calcium fluoride, and
 a thickness of the Faraday material in an optical axis direction is greater than or equal to 13 mm but smaller than or equal to 83 mm.

9. The ultraviolet laser apparatus according to claim 5, wherein
 a wavelength of the pulse laser light is a wavelength at which a KrF excimer laser oscillates,
 a Faraday material contained in each of the first and second Faraday rotators is synthetic quartz, and
 a thickness of the Faraday material in an optical axis direction is greater than or equal to 8 mm but smaller than or equal to 53 mm.

10. The ultraviolet laser apparatus according to claim 1, wherein
 a Faraday material contained in each of the first and second Faraday rotators includes a plurality of divided materials.

11. The ultraviolet laser apparatus according to claim 1, further comprising:
 a first optical axis adjustment mechanism provided between the second polarizer and the amplifier and including a first adjustment mechanism configured to perform adjustment around at least two axes,
 wherein the first optical axis adjustment mechanism includes a plane-parallel substrate configured to perform adjustment around two axes with aid of the first adjustment mechanism and transmit the pulse laser light.

12. The ultraviolet laser apparatus according to claim 11, further comprising:
 a second optical axis adjustment mechanism provided between the second polarizer and the amplifier and including a second adjustment mechanism configured to perform adjustment around at least two axes,
 wherein the second optical axis adjustment mechanism includes a highly reflective mirror configured to perform adjustment around two axes with aid of the second adjustment mechanism.

13. The ultraviolet laser apparatus according to claim 1, wherein the amplifier includes:
 a chamber filled with a laser gas and including a pair of discharge electrodes; and
 a resonator, and
 at the timing when the pulse laser light enters the chamber, high voltage pulses are applied to the pair of discharge electrodes to amplify the pulse laser light by the amplifier.

14. The ultraviolet laser apparatus according to claim 1, further comprising:
 a damper configured to absorb light output from the amplifier, passing through the second polarizer and the second Faraday rotator, and reflected off the first polarizer.

15. The ultraviolet laser apparatus according to claim 1, further comprising:
 an energy monitor provided between the oscillation-stage laser and the optical isolator and configured to measure pulse energy from the oscillation-stage laser.

16. An electronic device manufacturing method comprising:
 generating laser light amplified by an amplifier using an ultraviolet laser apparatus including
 an oscillation-stage laser configured to output linearly polarized pulse laser light having ultraviolet wavelengths,
 the amplifier configured to amplify the pulse laser light and output the amplified pulse laser light, and
 an optical isolator disposed on an optical path between the oscillation-stage laser and the amplifier,
 the optical isolator including
  a first Faraday rotator configured to rotate a polarization direction of the pulse laser light output from the oscillation-stage laser by a first angle in a first rotation direction with aid of a magnetic field in a first direction,
  a first polarizer so disposed that normalized transmittance for the pulse laser light that exits out of the first Faraday rotator is greater than or equal to 0.9,
  a second Faraday rotator configured to rotate the polarization direction of the pulse laser light passing through the first polarizer by a second angle in a second rotation direction that is an opposite direction to the first rotation direction with aid of a magnetic field in a second direction that is an opposite direction to the first direction, and
  a second polarizer so disposed that the normalized transmittance for the pulse laser light that exits out of the second Faraday rotator is greater than or equal to 0.9;
 outputting the amplified laser light to an exposure apparatus; and
 exposing a photosensitive substrate to the laser light in the exposure apparatus to manufacture electronic devices.

17. A system comprising:
 an ultraviolet laser apparatus; and
 an exposure apparatus, wherein
 the ultraviolet laser apparatus comprises:
  an oscillation-stage laser configured to output linearly polarized pulse laser light having ultraviolet wavelengths;
  an amplifier configured to amplify the pulse laser light and output the amplified pulse laser light; and
  an optical isolator disposed on an optical path between the oscillation-stage laser and the amplifier, the optical isolator including
- a first Faraday rotator configured to rotate a polarization direction of the pulse laser light output from the oscillation-stage laser by a first angle in a first rotation direction with aid of a magnetic field in a first direction,
- a first polarizer so disposed that normalized transmittance for the pulse laser light that exits out of the first Faraday rotator is greater than or equal to 0.9,
- a second Faraday rotator configured to rotate the polarization direction of the pulse laser light passing through the first polarizer by a second angle in a second rotation direction that is an opposite direction to the first rotation direction with aid of a magnetic field in a second direction that is an opposite direction to the first direction, and
- a second polarizer so disposed that the normalized transmittance for the pulse laser light that exits out of the second Faraday rotator is greater than or equal to 0.9, and wherein the exposure apparatus is configured to expose a photosensitive substrate to the pulse laser light amplified by the amplifier.

18. The system according to claim 17, wherein
a wavelength of the pulse laser light is a wavelength at which an ArF excimer laser oscillates,
a Faraday material contained in each of the first and second Faraday rotators is calcium fluoride, and
a thickness of the Faraday material in an optical axis direction is greater than or equal to 6 mm but smaller than or equal to 40 mm.

19. The system according to claim 17, wherein
a wavelength of the pulse laser light is a wavelength at which an ArF excimer laser oscillates,
a Faraday material contained in each of the first and second Faraday rotators is synthetic quartz, and
a thickness of the Faraday material in an optical axis direction is greater than or equal to 3 mm but smaller than or equal to 25 mm.

20. The system according to claim 17, wherein the ultraviolet laser apparatus comprises:
- a first optical axis adjustment mechanism provided between the second polarizer and the amplifier and including a first adjustment mechanism configured to perform adjustment around at least two axes,
- wherein the first optical axis adjustment mechanism includes a plane-parallel substrate configured to perform adjustment around two axes with aid of the first adjustment mechanism and transmit the pulse laser light.

\* \* \* \* \*